United States Patent
Benghezal et al.

(10) Patent No.: US 6,786,090 B2
(45) Date of Patent: Sep. 7, 2004

(54) DEPTH GAUGE (75) Inventors: Karim Benghezal, Chalons en Champagne (FR); Olivier Vaillant, Chalons en Champagne (FR); Christophe Gouzou, Chalons en Champagne (FR)

(73) Assignee: Marwal Systems, Chalons en Champagne (FR)

( * ) Notice: Subject to any disclaimer, the term of this patent is extended or adjusted under 35 U.S.C. 154(b) by 13 days.

(21) Appl. No.: 10/324,103

(22) Filed: Dec. 20, 2002

(65) Prior Publication Data
US 2003/0140696 A1 Jul. 31, 2003

(30) Foreign Application Priority Data
Dec. 21, 2001 (FR) ............................................. 01 16718

(51) Int. Cl.⁷ ............................................... G01F 23/28
(52) U.S. Cl. .................... 73/290 V; 73/290 R; 340/621
(58) Field of Search .......................... 73/290 V, 290 R; 340/621

(56) References Cited

U.S. PATENT DOCUMENTS

| 4,130,018 A | * | 12/1978 | Adams et al. ............ 73/290 V |
| 4,264,788 A | * | 4/1981 | Keidel et al. ................ 310/334 |
| 4,656,384 A | | 4/1987 | Magori |
| 5,095,748 A | | 3/1992 | Gregory et al. |
| 5,121,340 A | | 6/1992 | Campbell et al. |
| 6,236,142 B1 | | 5/2001 | Durkee |
| 6,412,344 B1 | * | 7/2002 | Danicich et al. .......... 73/290 V |

FOREIGN PATENT DOCUMENTS

EP        0 435 488        12/1990

* cited by examiner

Primary Examiner—Hezron Williams
Assistant Examiner—Rodney T Frank
(74) Attorney, Agent, or Firm—Foley & Lardner LLP (57) ABSTRACT

The invention provides a piezoelectric liquid gauge system in particular for a motor vehicle fuel tank, the system comprising piezoelectric means suitable for transmitting a sound wave in a liquid and for detecting said wave in order to determine the distance traveled by the wave in the liquid on the basis of the time between transmission and reception, said piezoelectric means comprising two distinct active piezoelectric portions suitable respectively for directing a sound wave towards a reference obstacle and a sound wave towards the surface of the liquid to be gauged, the system being wherein the pellet is contained in a housing suitable for being fixed in position in the tank in which measurement is to be performed, the reference obstacle extending over a face of the housing which faces one of the active portions, said face also having a measurement opening placed facing the other active portion and suitable for allowing the measurement sound waves to pass through.

20 Claims, 5 Drawing Sheets

FIG_1

FIG_2

FIG_3

FIG_4

FIG_5

FIG_8

FIG_9

DEPTH GAUGE

GENERAL TECHNICAL FIELD

The invention relates to gauging a liquid by means of a piezoelectric pellet.

More particularly, the invention relates to a liquid gauging device using a piezoelectric pellet in a housing.

STATE OF THE ART

Document EP 0 182 140 discloses devices for gauging liquid depth by means of piezoelectric pellets.

In that technique, the piezoelectric cells are adapted to transmit a sound wave from the bottom of a tank containing a liquid and to detect said wave, e.g. after reflection at the surface of the liquid, in order to determine the depth of the liquid through which the wave has traveled on the basis of the time interval between transmission and reception.

Document U.S. Pat. No. 5,095,748 describes in particular a gauging system having targets at known depths to which the sound waves are directed, said targets serving as reference depths for subsequently determining the depth of the liquid.

Unfortunately, those prior techniques present certain drawbacks.

The reference sound waves directed towards the targets and the sound waves for measuring the surface are sometimes confused, giving rise to false measurements or to measurements mixed with interference.

SUMMARY OF THE INVENTION

The invention seeks to mitigate those drawbacks.

To this end, the invention provides a piezoelectric liquid gauge system in particular for a motor vehicle fuel tank, the system comprising piezoelectric means suitable for transmitting a sound wave in a liquid and for detecting said wave in order to determine the distance traveled by the wave in the liquid on the basis of the time between transmission and reception, said piezoelectric means comprising two distinct active piezoelectric portions suitable respectively for directing a sound wave towards a reference obstacle and a sound wave towards the surface of the liquid to be gauged, wherein the pellet is contained in a housing suitable for being fixed in position in the tank in which measurement is to be performed, the reference obstacle extending over a face of the housing which faces one of the active portions, said face also having a measurement opening placed facing the other active portion and suitable for allowing the measurement sound waves to pass through.

The invention advantageously further comprises the following characteristics taken singly or in any technically feasible combination:

both active portions come from a common piezoelectric pellet;

the piezoelectric pellet is substantially disk-shaped, the active portion suitable for directing a sound wave towards the liquid surface being situated in the center of the disk and having a circular outline, the active portion suitable for directing a sound wave towards the reference obstacle extending around the central portion;

the opening in the wall of the housing facing the measurement active portion is of substantially the same dimensions as said measurement portion, said dimensions of the opening nevertheless being slightly greater;

the system includes a thermistor connected in parallel with the piezoelectric measurement means, said thermistor presenting resistance that is lower than the resistance of the piezoelectric measurement means throughout the operating temperature range of the vehicle;

the system includes a diode;

the system includes calculator means enabling the depth of liquid in the tank to be determined on the basis of the time separating transmission and reception of sound waves by the two active portions;

the calculator means are also suitable for determining the temperature of the liquid in the tank by measuring the resistance across the terminals of the thermistor;

the system includes support means for fixing the housing in position at the bottom of the tank;

the housing has means suitable for holding the piezoelectric means in position inside the housing;

the housing includes means suitable for holding the electrical connections of the pellet in position inside the housing;

the reference obstacles comprise wave reflectors, e.g. oriented at 45° relative to a vertical direction of the device placed in the tank and of bottom surface facing towards the nearest side walls of the housing;

the area of the reference obstacles is substantially equal to the area of the measurement opening; and the inside of the housing is subdivided into two volumes: a reference first volume; and a measurement second volume; the two volumes being separated by means of a separator tube extending from the top wall of the housing substantially in register with the separation between the two active portions of the pellet, and terminating before making contact with the active pellet fixed to the bottom of the housing.

BRIEF DESCRIPTION OF THE DRAWINGS

Other characteristics and advantages of the invention appear from the following description which is purely illustrative and non-limiting and which should be read with reference to the accompanying drawings, in which.

MORE DETAILED DESCRIPTION

In all of the figures, similar elements are given the same numerical references.

Figure 1:
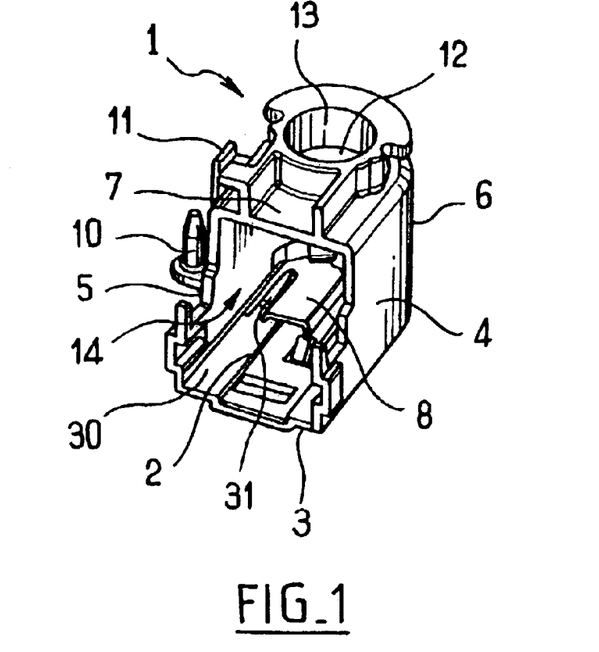
FIG. 1 is an overall perspective view of a gauging system of the invention.

FIG. 1 is an overall view of a gauging device 1 of the invention.

The device 1 comprises a housing 2 of substantially cylindrical shape. The base of the cylinder has an outline that is substantially U-shaped.

The housing 2 has five walls: a bottom wall 3; two plane walls 4 and 5 extending substantially perpendicularly from the bottom wall 3 facing each other and defining the plane sides of the housing 2; a semicylindrical curved wall 6 generated by the bend in the U-shape and interconnecting the plane walls 4 and 5; and a wall 7 closing the top portion of the housing 2 substantially parallel to its bottom wall 3 and including a measurement opening 12.

The bottom wall 3 has a substantially circular location 8 suitable for receiving a piezoelectric measurement pellet 9, itself also substantially circular.

The measurement pellet 9 is described below in the present description and is shown in particular in FIG. 6.

The bottom wall 3 also has means (not shown in the figures) suitable for receiving the pellet, together with the electronic components and connections needed to enable the gauging device 1 to operate.

These means comprise in particular a groove 30 for positioning the pellet and electrical connections on the bottom wall 3, non-electrically conductive means forming thrust springs for holding the pellet in position (once it is facing the measurement opening 12) together with its electrical connections, and also a locking catch for preventing the pellet and its electrical connections from moving once they are in place.

Figure 3:
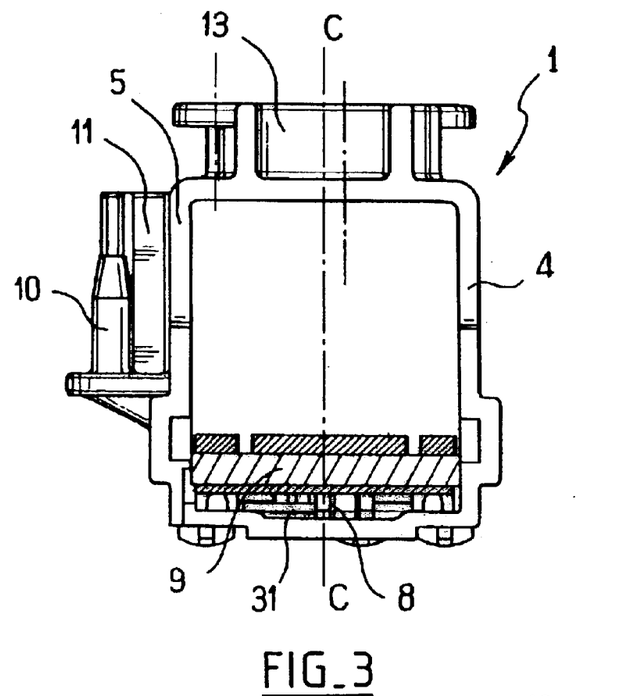
FIG. 3 is a cross-section view of the system of the invention.
Figure 7A:
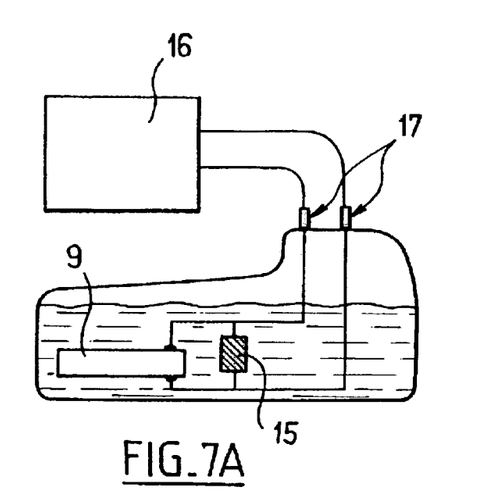
FIG. 7A is a circuit diagram showing a configuration of the system further comprising a thermistor connected in parallel between two connections of the pellet in order to measure the temperature.
Figure 7B:
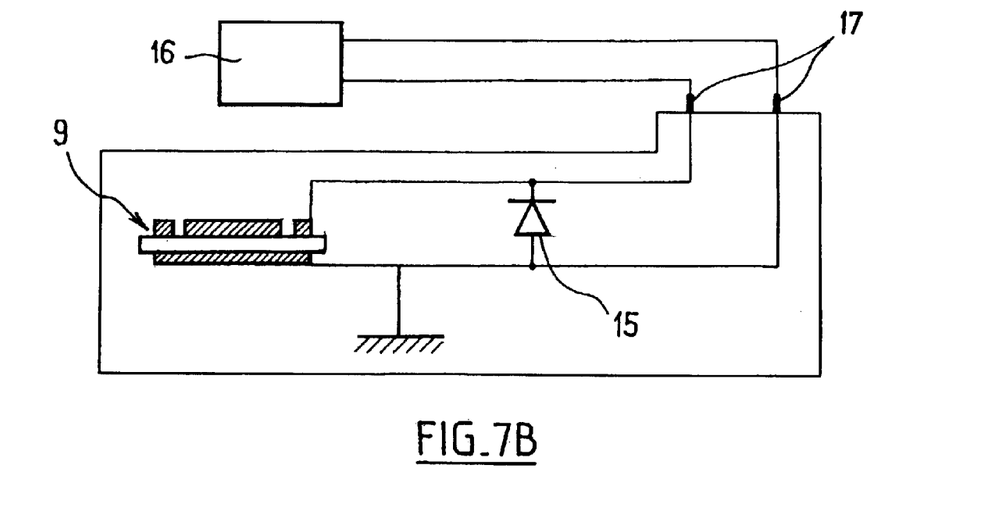
FIG. 7B is a circuit diagram of a system further comprising a diode connected in parallel between two connections of the pellet in order to measure temperature.

In FIG. 3, the bottom wall 3 also has a device 31 for holding the wires which connect the measurement pellet electrically to power supply and processing means 16 that can be seen in FIGS. 7A and 7B. The holding device 31 prevents the soldered electrical connections to the pellet breaking when forces are applied thereto. By way of example, the device 31 may comprise a non-conductive supporting spring blade.

The top wall 7 has an opening 12 facing the location 8 suitable for receiving the piezoelectric pellet. The opening 12 is substantially circular in shape, corresponding to the circular shape of the pellet.

However, the diameter of the opening 12 is slightly greater than the diameter of the active central measuring portion of the pellet, in order to minimize interference created by echoes from the reference surface while making measurements. The outline of the opening 12 is extended outwards by a cylinder 13 of walls that are integrally molded on the housing 2 starting from the opening 12.

The inside height of the device 1 is about 20 millimeters (mm).

The size of the system 1 in the direction of its longest dimension is about 35 mm.

The outside portion of one of the side walls, in this case the side wall 5, carries an indexing finger 10 extending parallel to the wall 5 with its end pointing towards the top of the device 1.

Figure 5:
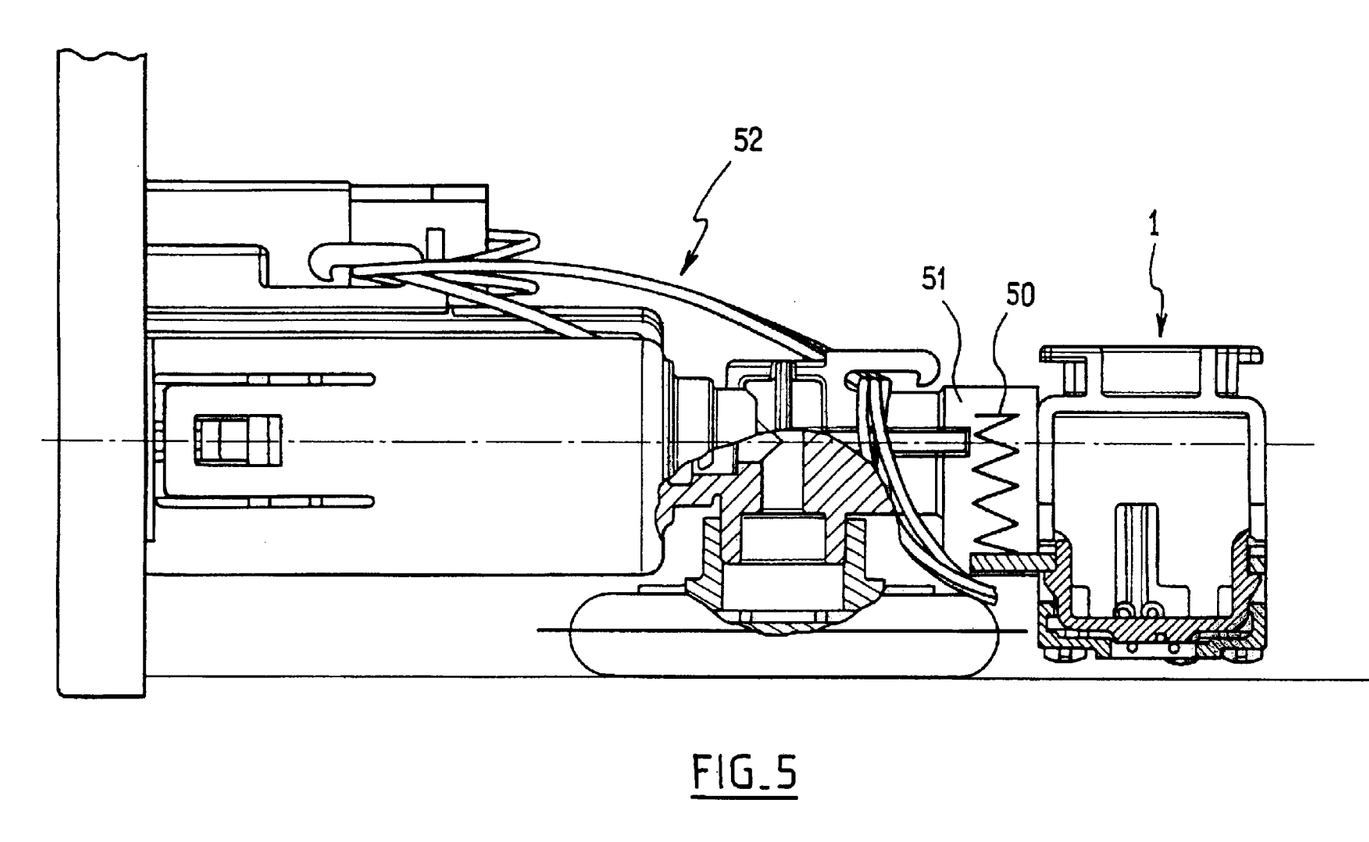
FIG. 5 is a view of fuel-drawing equipment provided with a gauging system of the invention shown partially in longitudinal section and suitable for placing in a tank.

In FIG. 5, the indexing finger 10 co-operates with a slideway type device 51 for fixing the housing 2 to a support and/or to a fuel-drawing or fuel-transferring device 52.

The housing 2 is fixed to the system 52 by being mounted in a vertical direction. The slideway device 51 is associated with an indexing spring 50 that can also be seen in FIG. 5 enabling the system 1 to be positioned on the fuel-drawing system 52 and the bottom of the tank in which the depth of liquid is to be measured.

A projection 11 formed integrally with the wall 5 and of substantially T-shape runs beside the indexing finger 10 and extends parallel to said indexing finger 10. The projection 11 is suitable for constituting a device for guiding the device 1 in the indexing system 51 of FIG. 5.

Facing the curved wall 6, the housing 2 has a large opening 14 suitable for allowing any contamination contained in the tank to escape from the housing 2, where such contamination might impede proper operation of the measurement system.

Figure 2:
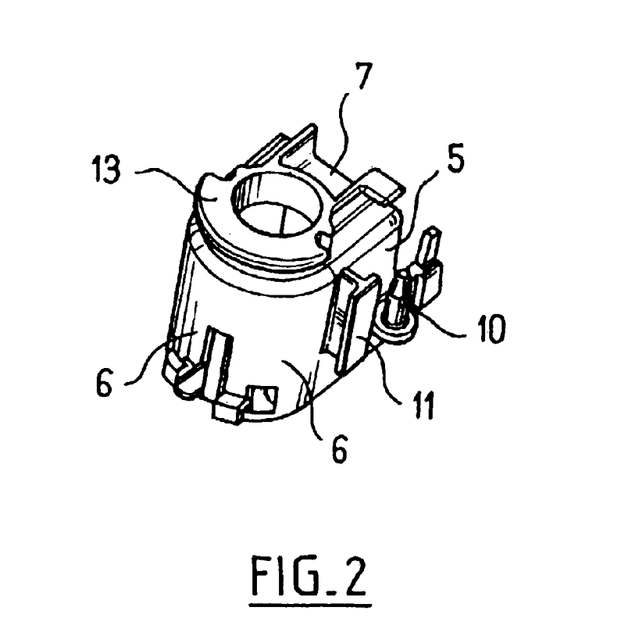
FIG. 2 is another overall view of the same system of the invention.

FIG. 2 is another overall view of the system of the present invention, but the curved wall 6 is more visible.

FIG. 3 is a cross-section view through the system 1. In this figure, the pellet 9 is in place in its location 8.

Figure 6:
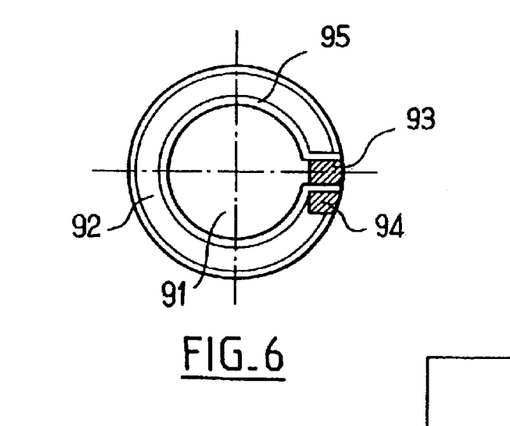
FIG. 6 is a plan view of one face of a piezoelectric pellet of the invention.

FIG. 6 shows that the pellet 9 has two different active zones 91 and 92 corresponding to the surface-measuring zone and to the reference zone, respectively.

The two portions 91 and 92 are separated by an insulating groove, but they are made from material coming from the same base referenced 95.

The portion 91 is situated at the center of the pellet 9 and constitutes substantially a disk.

The portion 92 is C-shaped around said portion 91.

The diameter of the opening 12 is selected so that the reference echo is strong enough when the reference portion is excited, and the interfering echo of the reference portion when the internal portion is excited is weak enough not to be detected.

Consequently, the annular surface are of the reference obstacle facing the portion 92 must be more or less equivalent to the measurement surface area, i.e. the area of the central portion 91.

For example, the diameter of the opening 12 can be equal to the diameter of the central portion 91 of the pellet 9.

The examples given herein are not limiting in any way, and reference can also be made to FIG. 6. For example, the diameter of the active portion of the pellet 9 may be 12.5 mm while the inside diameter of the opening 12 is 12.6 mm.

The groove separating the portions 91 and 92 is about 1 mm wide. Consequently, the inside diameter of the portion 92 is 2 mm greater than the diameter of the portion 91.

Electrically conductive portions 93 and 94 extend radially so as to provide electrical connections with the portions 91 and 92 respectively that are available at the periphery of the disk of the pellet 9.

The portion 93 makes electrical connection with the central portion 91 by passing through the opening of the C-shape of the portion 92.

Reference is made again to FIG. 3. The active zone 91 is situated in register with the opening 12. The active zone 92 is situated in register with the portions of the top wall 7 that surround the opening 12.

Figure 4:
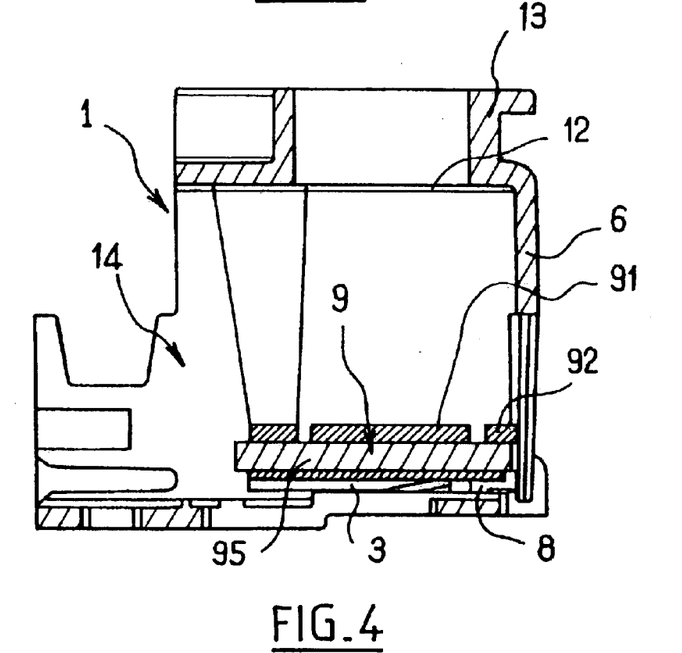
FIG. 4 is a longitudinal section on axis C—C of FIG. 3.

FIG. 4 is another cross-section view of the device on axis C—C shown in FIG. 3.

As can be seen in FIG. 5, the housing 2 is placed inside the tank, being fixed to a support and/or to a fuel-drawing and/or transfer device 52. It has numerous openings, in particular the opening 12 and the opening 14. Consequently, the liquid inside the tank completely fills the housing 2.

The portion 92 transmits and receives sound waves. The go-and-return travel times for the sound waves is a function of the inside height of the housing 2.

Calculator means 16 shown in FIGS. 7A and 7B and comprising electronic means determine the travel time of the sound wave. The travel time is preferably stored in the calculator means 16. It can be used as a reference for determining the reference speed of the sound waves in the liquid contained in the tank as a function of the inside height of the housing.

The active portion 91 then measures the go-and-return travel time for sound waves through the depth of liquid in the tank. The sound waves propagate out from the housing 12 towards the surface of the liquid by passing through the opening 12 and the cylinder 13.

The depth of the liquid is deduced from this travel time and from the travel speed of sound waves in the liquid in the tank.

The housing 2 is made of a material that is stable in fuel. For example it is possible to use a mixture of polyphenylene sulfide (PPS) and glass fibers.

In a particular and non-limiting embodiment shown in FIG. 7A, the liquid gauging system 1 further comprises a thermistor 15 connected in parallel on the power supply wires for the piezoelectric pellet 9.

In practice, the thermistor may be connected between any of the pairs of power supply wires to the measurement pellet, these wires comprising a ground wire, a wire connected to measurement portion 91, and a third wire connected to reference portion 92.

The temperature-measuring means may be constituted by means other than a thermistor. All they need to do is provide a characteristic which varies as a function of temperature.

FIG. 7B shows an embodiment in which the temperature-measuring means are not constituted by a thermistor, but instead by a diode whose junction voltage is a function of temperature. It is connected between ground and another power supply wire for the pellet.

This embodiment has the advantage of being compact. In addition, the connections to the pellet can be soldered directly to the faces of the pellet.

It is thus possible to measure the temperature of the fuel without disturbing the depth measurement. The direct current (DC) impedance of the piezoelectric pellet 9 is very high. Typically it is greater than 100 kilohms (kΩ).

With reference again to FIG. 7A, the resistance of the thermistor 14 is much lower than that of the piezoelectric pellet 9. Consequently, if the resistance is measured across the terminals 17 of the combined circuit, then to a first approximation, the resistance that is measured is that of the thermistor.

The characteristic of the thermistor i.e. the curve showing its resistance as a function of temperature, is stored in the calculator means 16.

When the piezoelectric sensor 19 is not performing a fuel depth measurement, the system 1 measures the resistance of the thermistor 15 using DC.

By mapping the behavior of the thermistor, the calculator means 16 deduces the temperature of the medium in which the thermistor is situated. The resistance of the thermistor is selected so that the presence of the thermistor does not disturb the measurement of the depth of the surface by means of the piezoelectric sensor 9.

If the resistance of the thermistor 15 is too low, then the measurements made by the pellet 9 are considerably affected.

Figure 8:
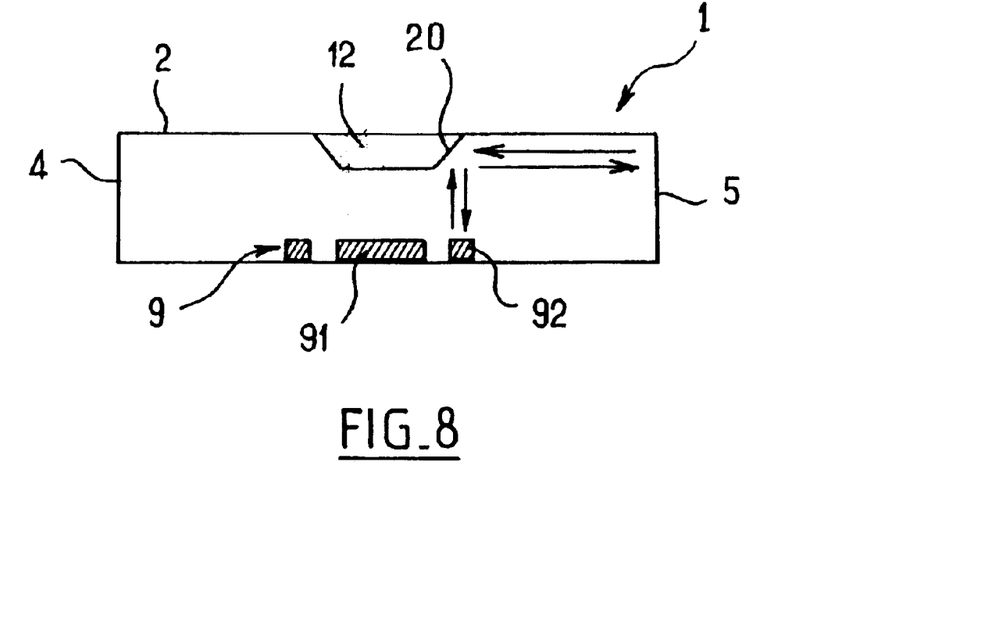
FIG. 8 is a diagram showing a variant reference obstacle of the invention.

FIG. 8 is a diagram showing a variant embodiment of the reference obstacles of the invention.

In this variant, the height of the device 1 is reduced by diverting the path followed by the reference sound waves in the height direction while maintaining a travel distance for the sound waves in the liquid that is substantially identical to that of the embodiment shown in FIGS. 1 to 4, for example.

The path followed by the sound waves within the housing 2 is thus "folded". For this purpose, the reference surfaces in register with the reference surface 92 include wave reflectors 20, e.g. oriented at 45° relative to a vertical direction of the device when in place in the tank, with the bottom surfaces thereof facing towards the nearest side wall.

Naturally, the angle at which the reflector is oriented could be arbitrary, said angle being half the angle through which the path of the sound waves is bent inside the housing.

In FIG. 8, the arrows represent the path followed by sound waves inside the housing 2.

These waves coming from the reference surface 92 of the pellet 9 go towards the sloping reflectors 20. These reflectors deflect the sound wave towards the closest side wall. The side wall itself reflects said wave back towards the reflector which then deflects it towards the portion for measuring reference waves, i.e. the portion 92 of the pellet 9.

The path of the reference sound waves is thus constituted by twice the vertical height of the device plus twice the distance between the reflector and the side wall. The distance traveled by the reference wave in the fluid is consequently sufficient to obtain a meaningful value for the reference speed of sound waves in the fluid, while still ensuring that the height of the device is relatively small.

Figure 9:
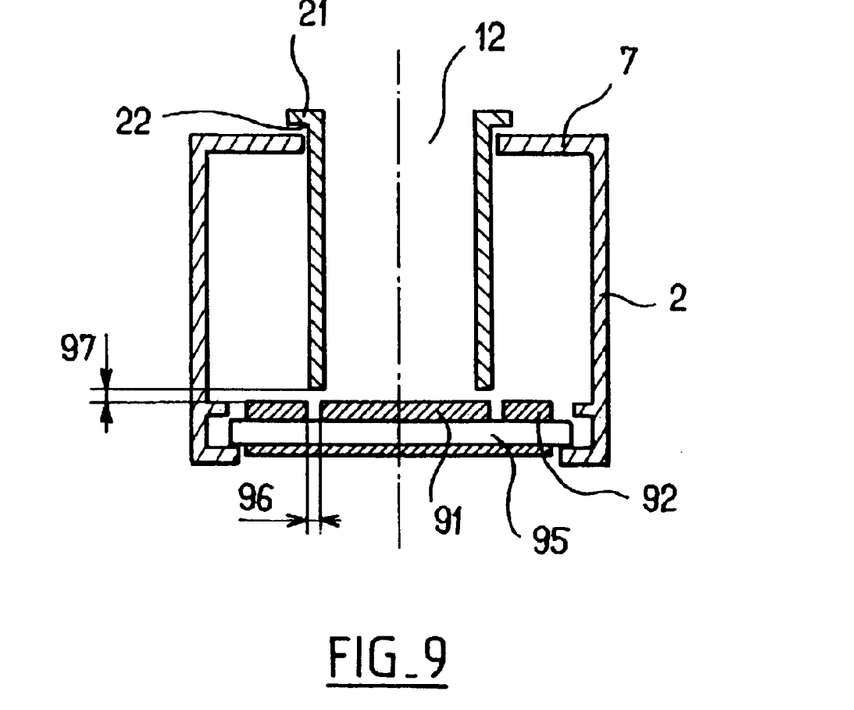
FIG. 9 is a diagram showing a variant of the invention in which the housing is subdivided into two volumes.

FIG. 9 is a diagram showing another variant of the invention.

In this variant, measurement quality is improved by separating the sound waves coming from the portion 91 as completely as possible from the sound waves coming from the portion 92.

A separator tube 21 is provided which extends from the top wall 7 of the housing 2 towards the pellet 9 and comes to an end about 1 mm away from the top portions of the pellet 9.

The walls of the tube extend substantially in register with the separation groove 96 between the two portions 91 and 92 of the pellet 9.

The sound waves are thus separated without the inside of the housing being fully separated into two distinct portions.

The separator tube 21 bears against the inside diameter of the opening 12. It is prevented from moving in translation by a shoulder 22.

It can be secured by being a tight fit, by heat sealing, or by any other means for fixing it to the housing 2.

The tube 21 may also be integrally molded with the top wall 7.

Advantages of the Invention

The height of the housing and the diameter of the opening 12 are selected in such a manner that the reflection of the reference sound wave is sufficient to be detected properly by the portion 92 of the pellet 9. Similarly, the reflection on the reference target portions surrounding the opening 12 when it is desired to measure the depth of the liquid are not detected by the central portion 91. Measurements of liquid depth are thus subject to very little interference.

It is possible to further reduce the height of the housing of the system by providing reference obstacles that include sloping reflectors.

The fact that the measurement pellet 9 is inside a housing 2 makes it possible for the reference height to be known with greater accuracy than is possible in prior art devices.

The housing 2 provides protection for the measurement device. In particular, it enables devices to be provided for protecting electrical connections and solder joints. The system 1 is less sensitive to impacts than are prior art systems.

The system 1 has one of the temperature-measuring means mounted in parallel with the surface measuring piezoelectric pellet. These means enable the temperature of the liquid present in the tank to be measured without requiring additional power supply wires.

The general advantage of measuring fuel temperature is to enable the engine controller to have a useful value for calculating fuel richness. This improves injection. It is also possible to verify the density of the fuel (which varies as a function of season, for example), and thus to obtain better injection precision.

The reference and measurement volumes may be separated by a separator tube extending substantially in register with the separation between the two active portions of the pellet.

What is claimed is:

1. A piezoelectric liquid gauge system for a tank, the system comprising a piezoelectric device adapted to transmit a sound wave in a liquid and to receive said wave in order to determine the distance traveled by the wave in the liquid on the basis of the time between transmission and reception, said piezoelectric device comprising two distinct active piezoelectric portions to generate and to direct a sound wave towards a reference obstacle and a sound wave towards a surface of the liquid to be gauged, respectively, wherein the active piezoelectric portions are contained in a housing adapted to be fixed in a position in the tank in which a measurement is to be performed, the reference obstacle extending over a face of the housing which faces one of the active portions, said face also having a measurement opening that faces the other active portion and is adapted to allow the sound waves to pass through.

2. The system according to claim 1, wherein both active portions are located in a common piezoelectric pellet.

3. The system according to claim 2, wherein the piezoelectric pellet is substantially disk-shaped, the active portion adapted to direct a sound wave towards the liquid surface being situated in the center portion of the disk and having a circular outline, the active portion adapted to direct a sound wave towards the reference obstacle extending around the central portion.

4. The system according to claim 1, wherein the area of an opening in a wall of the housing facing the active portion adapted to direct a soundwave towards the liquid surface is slightly greater than the dimensions of the surface area of the active portion adapted to direct a sound wave towards the liquid surface.

5. The system according to claim 1, including a temperature device connected in parallel with the piezoelectric measurement device, a portion of the temperature-measuring device being adapted to vary as a function of temperature, the resistance of said temperature-measuring device being lower than the resistance of the piezoelectric measurement device over the entire range of utilization temperatures.

6. The system according to claim 5, wherein the temperature-measuring device comprises a thermistor.

7. The system according to claim 6, wherein the temperature-measuring device is connected across a pair of power supply wires to the piezoelectric device.

8. The system according to claim 5, wherein the temperature-measuring device comprises a diode.

9. The system according to claim 1, further comprising a calculator device adapted to determine the depth of liquid in the tank on the basis of the time separating transmission and reception of sound waves by the two active portions.

10. The system according to claim 6, further comprising a calculator device adapted to determine the temperature of the liquid in the tank by measuring the resistance across the terminals of the thermistor.

11. The system according to claim 1, further including a support device adapted to fix the housing in a position at the bottom of the tank.

12. The system according to claim 1, wherein the housing has a device adapted to hold the piezoelectric device in a position inside the housing.

13. The system according to claim 1, wherein the housing includes a device adapted to hold the electrical connections of the active piezoelectric portions in a position inside the housing.

14. The system according to claim 1, wherein the reference obstacles comprise wave reflectors oriented, relative to a vertical direction of the system when placed in the tank, at an angle equal to half the angle through which the sound wave path is deflected, said reflectors having bottom surfaces facing towards nearest side walls of the housing.

15. The system according to claim 14, wherein the reflectors are oriented at 45°.

16. The system according to claim 1, wherein the area of the reference obstacles is substantially equal to the area of the measurement opening.

17. A piezoelectric liquid gauge system for a tank, the system comprising a piezoelectric device adapted to transmit a sound wave in a liquid and to receive said wave in order to determine the distance traveled by the wave in the liquid on the basis of the time between transmission and reception, said piezoelectric device comprising two distinct active piezoelectric portions adapted to generate a sound wave towards a reference obstacle and a sound wave towards a surface of the liquid to be gauged, respectively, wherein the active piezoelectric portions are contained in a housing adapted to be fixed in a position in the tank in which a measurement is to be performed, the reference obstacle extending over a face of the housing which faces one of the active portions, said face also having a measurement opening that faces the other active portion and is adapted to allow the sound waves to pass through, wherein the inside of the housing is subdivided into two volumes: a reference first volume; and a measurement second volume; the two volumes being separated by means of a separator tube extending from the top wall of the housing substantially in register with the separation between the two active portions, and terminating before making contact with the active portions fixed to a bottom of the housing.

18. The system according to claim 1, wherein the system is adapted for use in a motor vehicle fuel tank.

19. The system according to claim 3, wherein the dimensions of an opening in a wall of the housing facing the active portion situated in the center of the disk is of slightly greater dimensions than the active portion situated in the center of the disk.

20. A piezoelectric liquid gauge system for a tank, the system comprising a piezoelectric device adapted to transmit a sound wave in a liquid and to receive said wave in order to determine the distance traveled by the wave in the liquid on the basis of the time between transmission and reception, said piezoelectric device comprising two distinct active piezoelectric portions adapted to generate and to direct a sound wave towards a reference obstacle and a sound wave towards a surface of the liquid to be gauged, respectively, wherein the active piezoelectric portions are contained in a housing adapted to be fixed in a position in the tank in which a measurement is to be performed, the reference obstacle extending over a face of the housing which faces one of the active portions, said face also having a measurement opening that faces the other active portion and is adapted to allow the sound waves to pass through, wherein measurement quality is improved by separating the sound waves coming from the reference obstacle from the sound waves coming from the surface of the liquid to be gauged by a separator tube.

* * * * *